US006886388B1

(12) United States Patent
McGill et al.

(10) Patent No.: US 6,886,388 B1
(45) Date of Patent: May 3, 2005

(54) CONTIGUOUS DOUBLE CONTAINMENT UNDERGROUND STORAGE TANK FUELING SYSTEM AND METHODS FOR DETECTING LEAKS THEREIN

(76) Inventors: M. Daniel McGill, 8281 W. Commonwealth, Buena Park, CA (US) 90621; Thompson W. Wyper, 8281 W. Commonwealth, Buena Park, CA (US) 90621

( * ) Notice: Subject to any disclaimer, the term of this patent is extended or adjusted under 35 U.S.C. 154(b) by 0 days.

(21) Appl. No.: 10/421,675

(22) Filed: Apr. 23, 2003

Related U.S. Application Data
(60) Provisional application No. 60/375,491, filed on Apr. 24, 2002.

(51) Int. Cl.$^7$ .......................... G01M 3/04; F16L 55/10
(52) U.S. Cl. ...................... 73/40.5 R; 73/49.2; 73/49.8; 138/90
(58) Field of Search .......................... 73/40, 40.5, 46, 73/49.1, 49.2, 49.3, 49.8; 138/90

(56) References Cited

U.S. PATENT DOCUMENTS

| | | | | |
|---|---|---|---|---|
| 2,477,334 A | * | 7/1949 | Hibner et al. ................ 277/505 |
| 4,741,199 A | * | 5/1988 | Spencer .......................... 73/46 |
| 4,918,978 A | * | 4/1990 | Green ......................... 73/49.2 |
| 4,932,257 A | * | 6/1990 | Webb ....................... 73/40.5 R |
| 5,072,623 A | * | 12/1991 | Hendershot .................. 73/49.2 |
| 5,140,848 A | * | 8/1992 | Spencer .......................... 73/46 |
| 5,184,504 A | | 2/1993 | Spring |
| 5,277,455 A | * | 1/1994 | Graves et al. ................. 285/55 |
| 5,295,760 A | | 3/1994 | Rowe |
| 5,331,841 A | * | 7/1994 | Beaver et al. ............... 73/49.2 |
| 5,345,813 A | * | 9/1994 | Flessas ........................... 73/46 |
| 5,398,976 A | | 3/1995 | Webb |
| 5,505,327 A | * | 4/1996 | Witt ........................... 73/49.2 |
| 5,533,547 A | | 7/1996 | Arn |
| 5,589,631 A | | 12/1996 | Spring et al. |
| 5,596,138 A | * | 1/1997 | Onodera et al. ............. 73/49.2 |
| 5,704,656 A | | 1/1998 | Rowe |
| 5,722,699 A | | 3/1998 | Brancher |
| 5,782,579 A | * | 7/1998 | Dupouy et al. ............... 405/52 |
| 5,996,401 A | * | 12/1999 | Lewis ........................ 73/49.2 |
| 6,230,735 B1 | * | 5/2001 | Bravo ......................... 137/312 |
| 2003/0033855 A1 | * | 2/2003 | Manger et al. ................ 73/37 |

OTHER PUBLICATIONS

U.S. Provisional Appl. No. 60/312624.*
State Water Resources Control Board, *Amendments for Implementation of SB 989* Underground Storage Tank Regulations, May 14, 2001, pp. 1–29, Title 23, Division 3, Chapter 16, CCR, State of California.
Assembly Member Frommer, *AB 2481 Assembly Bill*, Chapter 999, Sep. 27, 2002, pp. 1–79.
American Petroleum Institute, *Installation of Underground Petroleum Storage Systems*, API Recommended Practice 1615, Mar. 1996, pp. 29–32, Fifth Edition.
State Water Resources Control Board, *Installation And Monitoring Requirements For Underground Storage Tanks Installed On Or After Jul. 1, 2003*, Assembly Bill 2481; May 30, 2003, pp. 1–5, Division of Water Quality, Sacramento, California.

\* cited by examiner

*Primary Examiner*—Michael Cygan
(74) *Attorney, Agent, or Firm*—Christie, Parker & Hale, LLP

(57) ABSTRACT

A penetration fitting for forming a sealed connection between a conduit and a containment structure in an underground storage tank fueling system is provided that includes a main fitting element for forming a sealed connection to each of the conduit and the containment structure, wherein the main fitting element includes an interstitial space that is in fluid communication with each of the conduit and the containment structure. In one embodiment a monitoring fluid is disposed in the interstitial space and a sensor is used to monitor the level of the monitoring fluid.

36 Claims, 12 Drawing Sheets

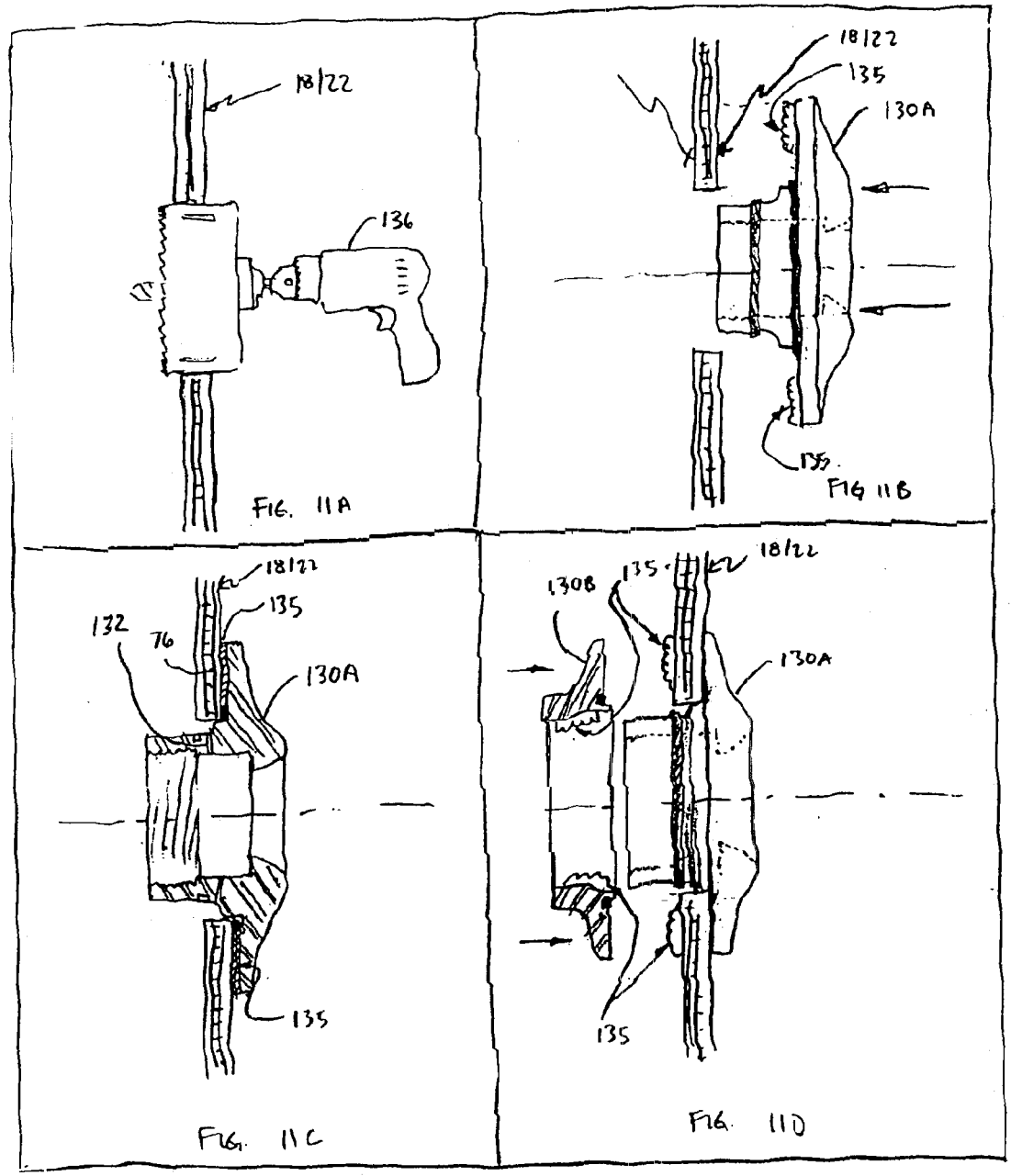

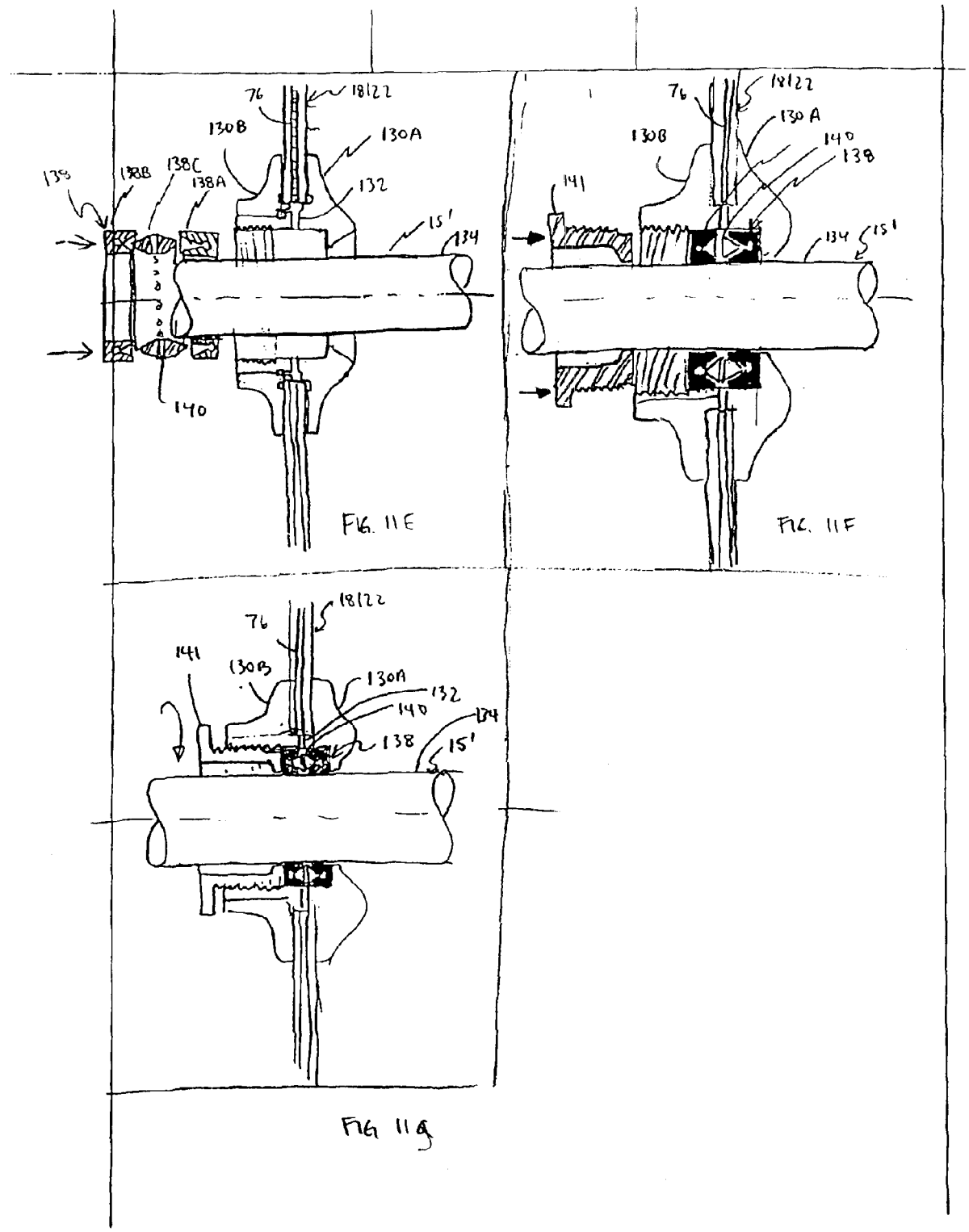

CONTIGUOUS DOUBLE CONTAINMENT UNDERGROUND STORAGE TANK FUELING SYSTEM AND METHODS FOR DETECTING LEAKS THEREIN

CROSS-REFERENCE TO RELATED APPLICATION

This application claims priority under 35 U.S.C. §119(e) to U.S. Provisional Application Ser. No. 60/375,491, filed on Apr. 24, 2002, the disclosure of which is incorporated by reference.

FIELD OF THE INVENTION

The present invention relates generally to a contiguous double containment underground storage tank fueling system and particularly, in one embodiment, to an improved contiguous double containment underground storage tank fueling system. Another embodiment of the present invention relates to improved penetration fittings associated with an underground storage tank fueling system to reduce and/or prevent product from escaping the underground storage tank fueling system.

BACKGROUND

Over the last several decades there has been a continual change in the design of underground storage tank fueling systems used in retail petroleum service stations. Since Jan. 1, 1987, the State of California has required that all new underground storage tanks (UST's), which contain hazardous substances such as gasoline, be secondarily contained (i.e. double walled) and monitored for leaks. Additionally, all pipelines that transport the hazardous substance from the UST to above ground product dispensers must also be secondarily contained and monitored for leaks. More recent regulations (Dec. 22, 1998) have required the installation of a containment sump, commonly referred to as an under dispenser containment sump, around the turbines that pump the hazardous material from the UST to the above ground product dispensers.

On May 14, 2001, Senate Bill 989 (SB989) amended California's UST regulations. SB 989 required that the secondary containment on all UST systems be tested for leaks prior to Dec. 31, 2002. For most of the secondary containment systems installed since 1987, this was the first time they had been tested for leaks since they were installed. Upon testing, it was found that between 70 and 80% of all UST systems tested required some sort of a repair in order to pass the regulations. Typically, the secondary containment in these systems were not tight and leaked. As a result, many of the systems failed the initial testing. The leaks that were discovered during the testings were typically found in the penetration fittings that were used to connect the pipelines to the UST containment sump and the under dispenser containment sump. These penetration fittings were typically elastomeric boot-type penetration fittings. A problem with these fittings is that fuel vapors tend to deteriorate the elastomeric material of the fittings, thus damaging the fittings to the point where leaks occur.

Accordingly, a need exists for an improved contiguous double containment underground storage tank fueling system and/or improved penetration fittings associated therewith to reduce and/or prevent product from escaping the underground storage tank fueling system.

SUMMARY

In one embodiment, the present invention is a penetration fitting for forming a sealed connection between a conduit and a containment structure in an underground storage tank fueling system. The penetration fitting includes a main fitting element for forming a sealed connection to each of the conduit and the containment structure, wherein the main fitting element includes an interstitial space that is in fluid communication with each of the conduit and the containment structure.

In another embodiment, the present invention is an underground storage tank fueling system that includes a conduit and a containment structure having an inner wall, an outer wall and a containment structure interstitial space therebetween. The system also includes a penetration fitting forming a sealed connection with the conduit and the containment structure to sealingly connect the conduit to the containment structure, wherein the penetration fitting includes a penetration fitting interstitial space that is in fluid communication with each of the conduit and the containment structure interstitial space.

In yet another embodiment, the present invention is a method for detecting leaks in an underground storage tank fueling system that includes providing a conduit and providing a containment structure having an inner wall, an outer wall and a containment structure interstitial space therebetween. The method also includes sealingly connecting a penetration fitting to the conduit and to the containment structure to sealingly connect the conduit to the containment structure and forming an interstitial space in the penetration fitting that is in fluid communication with each of the conduit and the containment structure interstitial space.

BRIEF DESCRIPTION OF THE DRAWINGS

These and other features and advantages of the present invention will be better understood by reference to the following detailed description when considered in conjunction with the accompanying drawings wherein:

FIGS. 11A–11G are cross-sectional views depicting one embodiment for assembling a penetration fitting, having an electrical conduit disposed therein, to a containment sump wall.

DETAILED DESCRIPTION OF EMBODIMENTS OF THE INVENTION

As shown in FIGS. 1–9, embodiments of the present invention are directed to a contiguous double containment underground storage tank fueling system 10 and to bulkhead penetration fittings 24 for the contiguous double containment underground storage tank fueling system 10.

Figure 1:
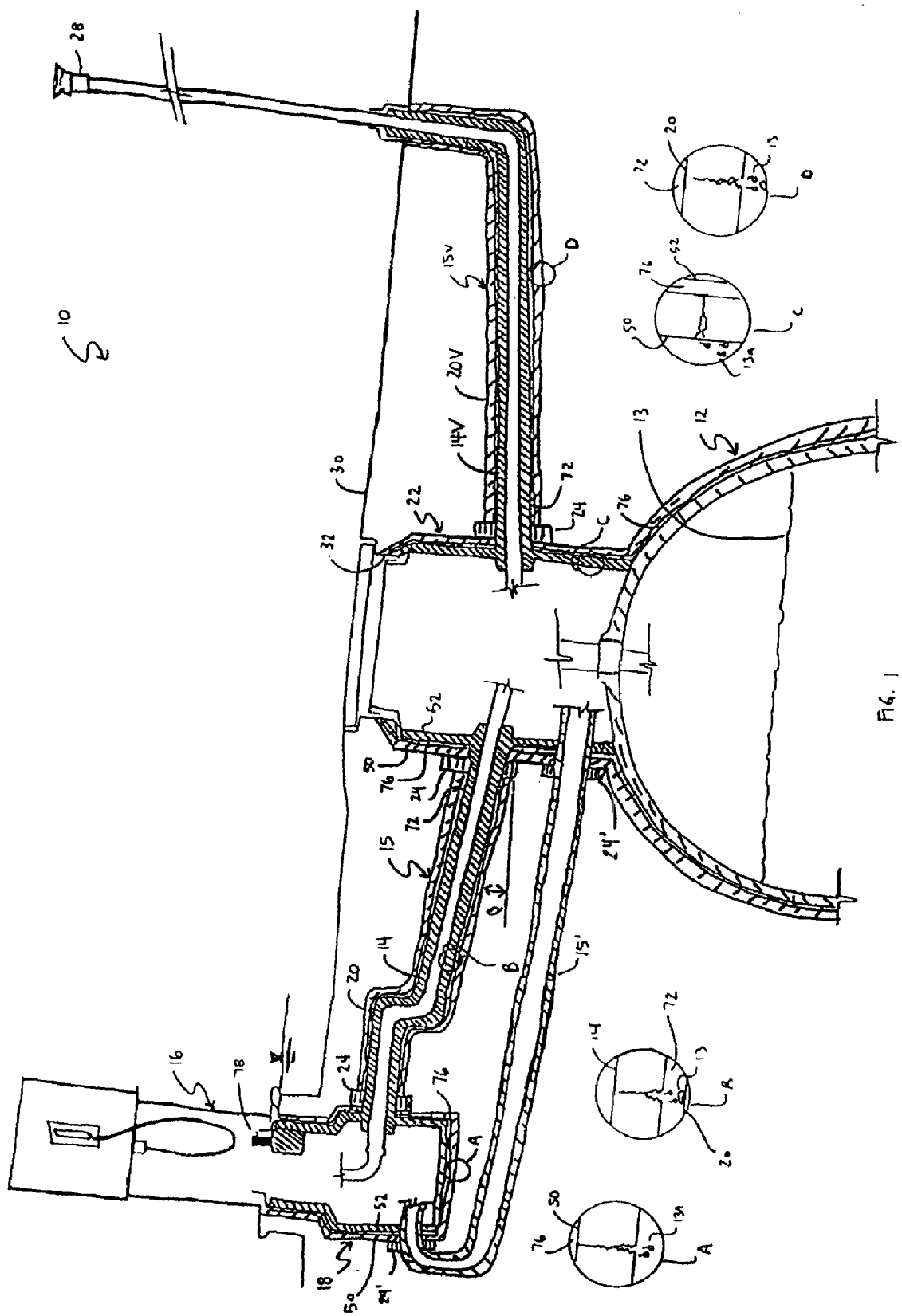
FIG. 1 is a double containment underground storage tank fueling system according to one embodiment of the present invention having a high point level sensor for detecting leaks in the system.

As shown in FIG. 1, the contiguous double containment underground storage tank fueling system 10 according to one embodiment of the present invention includes a double walled underground storage tank (UST) 12, which stores a product 13 such as gasoline. A double walled product pipeline 15, through which the product 13 travels, extends from the UST 12 to an above ground product dispenser 16. A double walled dispenser containment sump 18 is installed beneath the product dispenser 16. The double walled product pipeline 15 includes a primary pipeline 14 that extends from the UST 12 to the product dispenser 16 and a secondary pipeline 20 that surrounds the primary pipeline 14 and extends from the dispenser containment sump 18 to a tank top containment sump 22, which is mounted above the UST 12.

The secondary pipeline 20 collects any product 13 that leaks from any damaged portion of the primary pipeline 14 to reduce and/or prevent the leaked product from contaminating the environment surrounding the damaged portion of the primary pipeline 14. The secondary pipeline 20 is monitored for collection of the product 13 so that when any product 13 leaks through a damaged portion of the primary pipeline 14 and into the secondary pipeline 20, the damaged portion of the primary pipeline 14 can be promptly repaired to prevent the product 13 from further leaking through the primary pipeline 14.

Ends of the secondary pipeline 20 are connected to the containment sumps 18 and 22 via bulkhead penetration fittings 24. The penetration fittings 24 reduce and/or prevent the product 13 from leaking at the junctions of the secondary pipeline 20 and the containment sumps 18 and 22.

The system 10 also includes a double walled vapor pipeline 15V for transporting excess product vapors from the tank top containment sump 22 to a tank vent 28. As with the product pipeline 15, the vapor pipeline 15V includes a primary vapor pipeline 14V and a secondary vapor pipeline 20V. An end of the secondary vapor pipeline 20V is connected to the tank top containment sump 22 via the penetration fitting 24. The penetration fitting 24 reduces and/or prevents product vapors from leaking at the junction of the secondary vapor pipeline 20V and the tank top containment sump 22. As shown in FIG. 1, the tank top containment sump 22 is accessible from a ground surface 30 via a manway 32.

For clarity, except where specifically referred to otherwise, hereinafter the product pipeline 15 and the vapor pipeline 15V are collectively referred to as the product pipeline 15, the primary pipeline 14 and the primary vapor pipeline 14V are collectively referred to as the primary pipeline 14, the secondary pipeline 20 and the secondary vapor pipeline 20V are collectively referred to as the secondary pipeline 20 and the dispenser containment sump 18 and the tank top containment sump 22 are collectively referred to as the containment sump 22.

Figure 3:
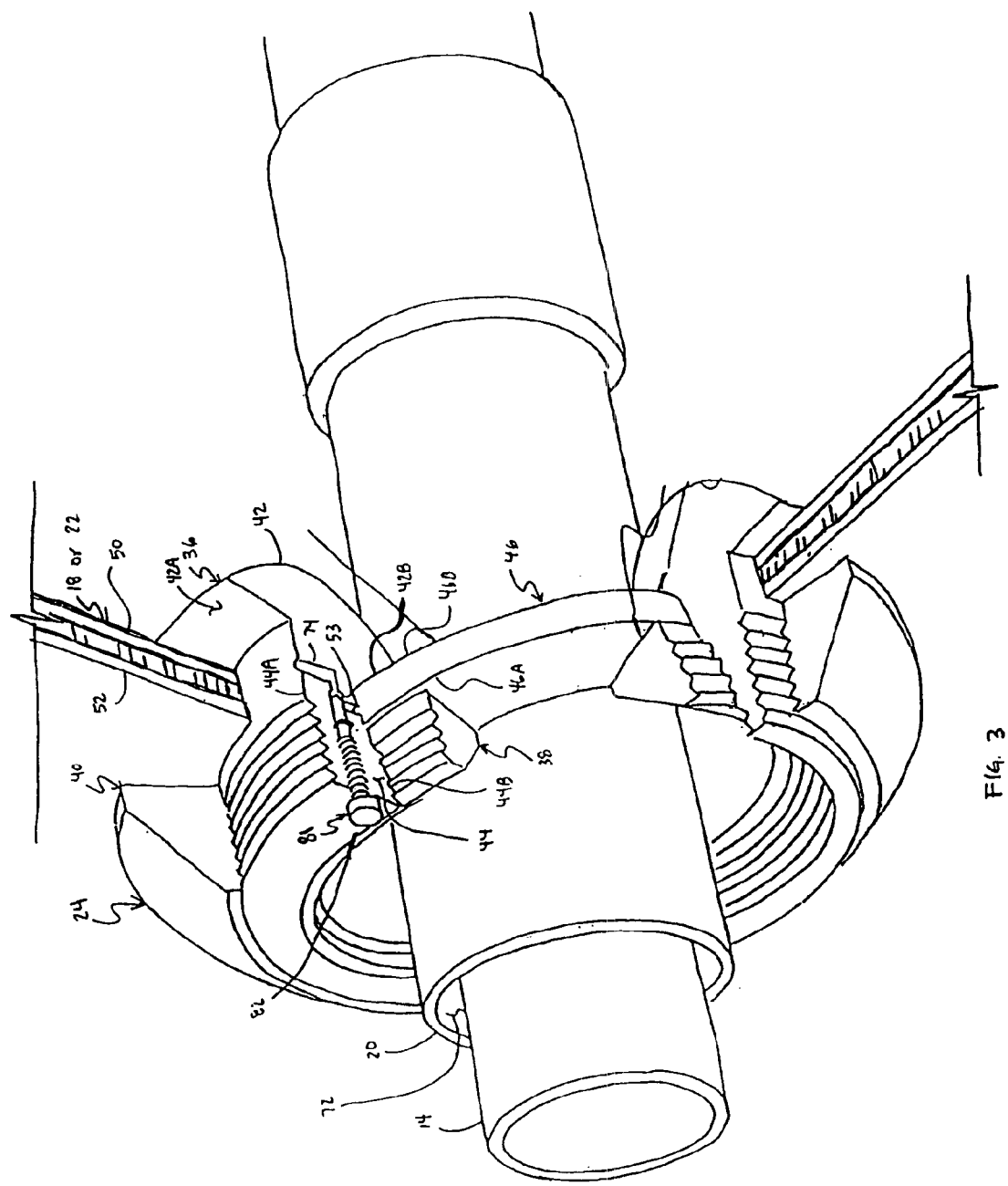
FIG. 3 is a cut away perspective view of a bulkhead penetration fitting for use in a double containment underground storage tank fueling system according to one embodiment of the present invention.

One embodiment of the penetration fitting 24 according to the present invention is shown in FIGS. 3–6. As shown in FIG. 3, the penetration fitting 24 includes a main fitting element 36 and inner and outer clamp rings 38 and 40, respectively. The inner and outer clamp rings 38 and 40 combine with the main fitting element 36 to form a fluid tight seal between the containment sump 22 and the secondary pipeline 20.

Figure 4:
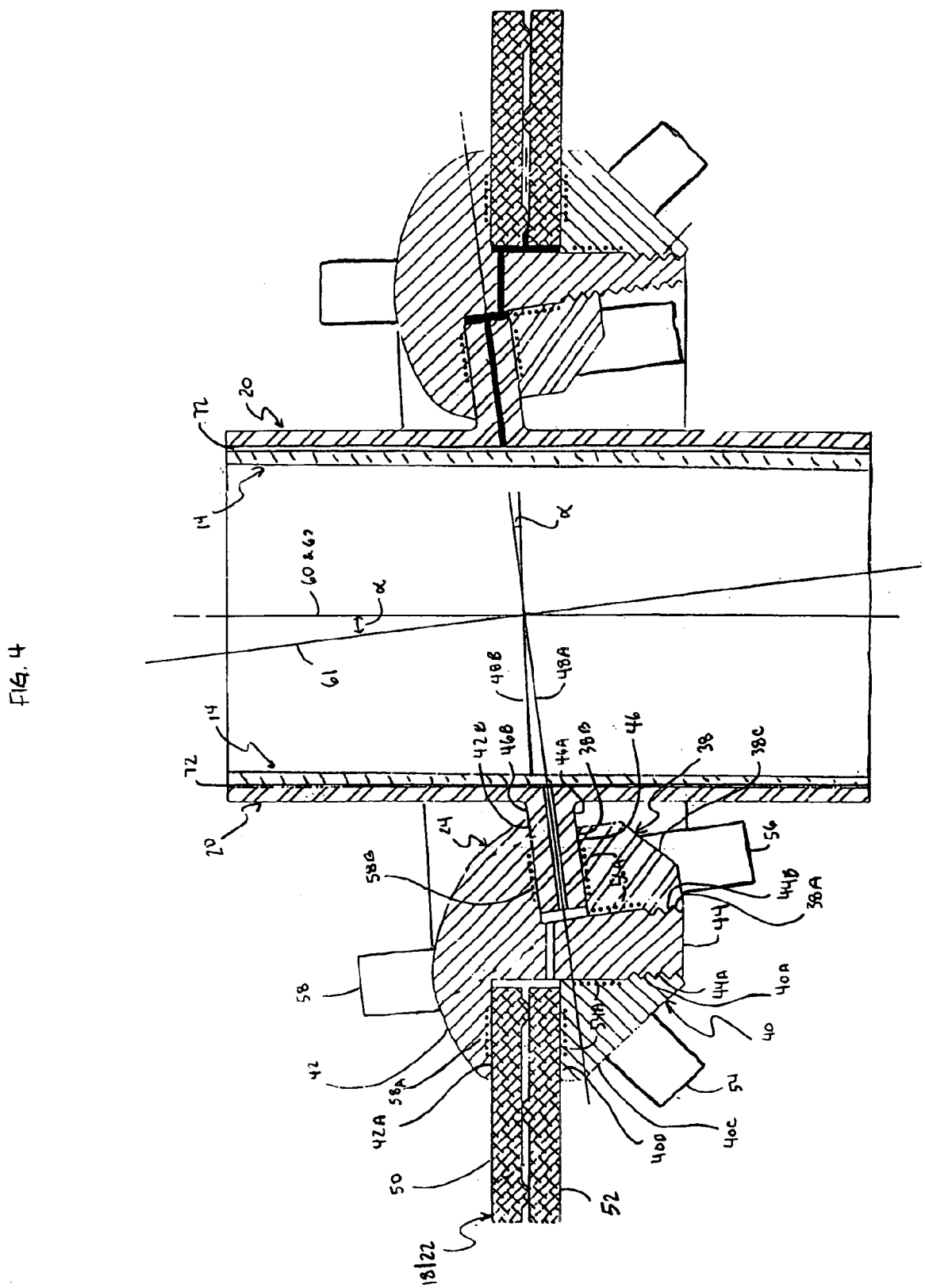
FIG. 4 is a cross-sectional view of the penetration fitting of FIG. 3 having a minimum insertion angle.

In one embodiment, the main fitting element 36 is generally annular having a semi-circular portion 42 defined by first and second sealing surfaces 42A and 42B and having a tapered nipple portion 44 attached to the semi-circular portion 42 (see FIGS. 3 and 4). In one embodiment, the second sealing surface 42B is cut at an angle. In this embodiment, the secondary pipeline 20 includes an angled disc or collar (hereinafter referred to as an offset collar 46) that is coupled to an outer diameter of the secondary pipeline 20 such that a radial axis 48A of the offset collar 46 forms an offset angle α with a radial axis 48B of the secondary pipeline 20 that is substantially equal to the angle of the cut in the second sealing surface 42B. As such, the second sealing surface 42B receives a second side 46B of the offset collar 46 of the secondary pipeline 20 and the first sealing surface 42A receives an outer wall 50 of the double walled containment sump 22.

The nipple portion 44 of the main fitting element 36 comprises an annular threaded outer diameter 44A and a tapered threaded inner diameter 44B. The inner and outer clamp rings 38 and 40 engage the threads of the threaded outer diameter 44A and the threaded inner diameter 44B, respectively, of the nipple portion 44 of the main fitting element 36 to couple the clamp rings 38 and 40 to the main fitting element 36. In one embodiment, at least one orifice is drilled or molded through the nipple portion 44 of the main fitting element 36 forming an interstitial nipple portion space 53, for example, substantially perpendicular to a longitudinal axis of the nipple portion 44 of the main fitting element 36, to allow an interstitial communication between an interstitial space between the primary and secondary pipelines, and an interstitial space between the double walls of the containment sump, discussed in further detail below.

The outer clamp ring 40 is an annular collar comprising a threaded inner wall 40A, a bottom surface 40B, and a chamfer 40C. The threads of the inner wall 40A engage the threaded outer diameter 44A of the nipple portion 44 to engage the bottom surface 40B with an inner wall 52 of the double walled containment sump 22. The chamfer 40C carries a piezo-electrical fusion socket 54 which supplies electrical charges to a plurality of electrodes 54A disposed along a portion of the inner wall 40A and a portion of the bottom surface 40B of the outer clamp ring 40. A charge supplied to the electrodes 54A from the fusion socket 54 produces heat that fuses the inner wall 40A to the outer diameter 44A of the nipple portion 44 and fuses the bottom surface 40B to the inner wall 52 of the double walled containment sump 22.

The inner clamp ring 38 is an annular collar comprising a threaded outer wall 38A, a bottom surface 38B, and a chamfer 38C. The threads of the outer wall 38A engage the threaded inner diameter 44B of the nipple portion 44 to engage the bottom surface 38B with a first side 46A the offset collar 46 of the secondary pipeline 20. The chamfer 38C carries a piezo-electric fusion socket 54 that supplies electricity to a plurality of electrodes 56A disposed along a portion of the outer wall 38A and a portion of the bottom surface 38B of the inner clamp 38. A charge supplied to the electrodes 56A from the fusion socket 56 produces heat that fuses the inner wall 38A to the inner diameter 44B of the nipple portion 44 and fuses the bottom surface 38B to the first side 46A the offset collar 46.

The first and second sealing surfaces 42A and 42B of the semi-circular portion 42 of the main fitting element 36 also contain a plurality of electrodes 58A and 58B. In addition, the semi-circular portion 42 of the main fitting element 36 also carries a piezo-electrical fusion socket 58 which is electrically connected to the electrodes 58A and 58B such that a charge supplied to the electrodes 58A and 58B from the fusion socket 58 produces heat that fuses the first sealing surface 42A to the outer wall 50 of the double walled containment sump 22 and fuses the second sealing surface 42B to the second side 46B of the offset collar 46 of the secondary pipeline 20.

The penetration fitting 24, including the main fitting element 36 and the inner and outer clamps 38 and 40, is preferably constructed of a material that is similar to the material of the double walled containment sump 22 and the material of the secondary pipeline 20 to facilitate the fusing or chemical bonding of the penetration fitting 24 to the double wall containment sump 22 and to the secondary pipeline 20, as described above. For example, the material of the penetration fitting 24, may be a high density polyethylene (HDPE), a fiberglass reinforced plastic (FRP), or any other material that is suitably compatible with a wide variety of piping and containment sump materials.

The penetration fitting 24 described above has several advantages over elastomeric fittings. For example, the material of the penetration fitting 24 of the present invention is unlikely to be deteriorated by the product vapors as often occurs with elastomeric fittings. The material of the penetration fitting 24 of the present invention is also stronger than elastomeric materials, thus lessening the physical damage caused by improper handling and maintenance of the penetration fittings 24 after initial installation. In addition, the fusing of the penetration fitting 24 to the containment sump 22 and to the secondary pipeline 20 creates a much stronger bond than that which is commonly created between an elastomeric fitting and containment sumps or product pipelines.

One reason for the popularity of the elastomeric boot type penetration fittings is that they allow a product pipeline to be inserted into a containment sump at any one of a variety of different insertion angles. However, elastomeric boot type penetration fittings have proven to be unreliable over time and are frequently the cause of SB 989 test failures, often due to the product vapors deteriorating the elastomeric material over time.

Figure 5:
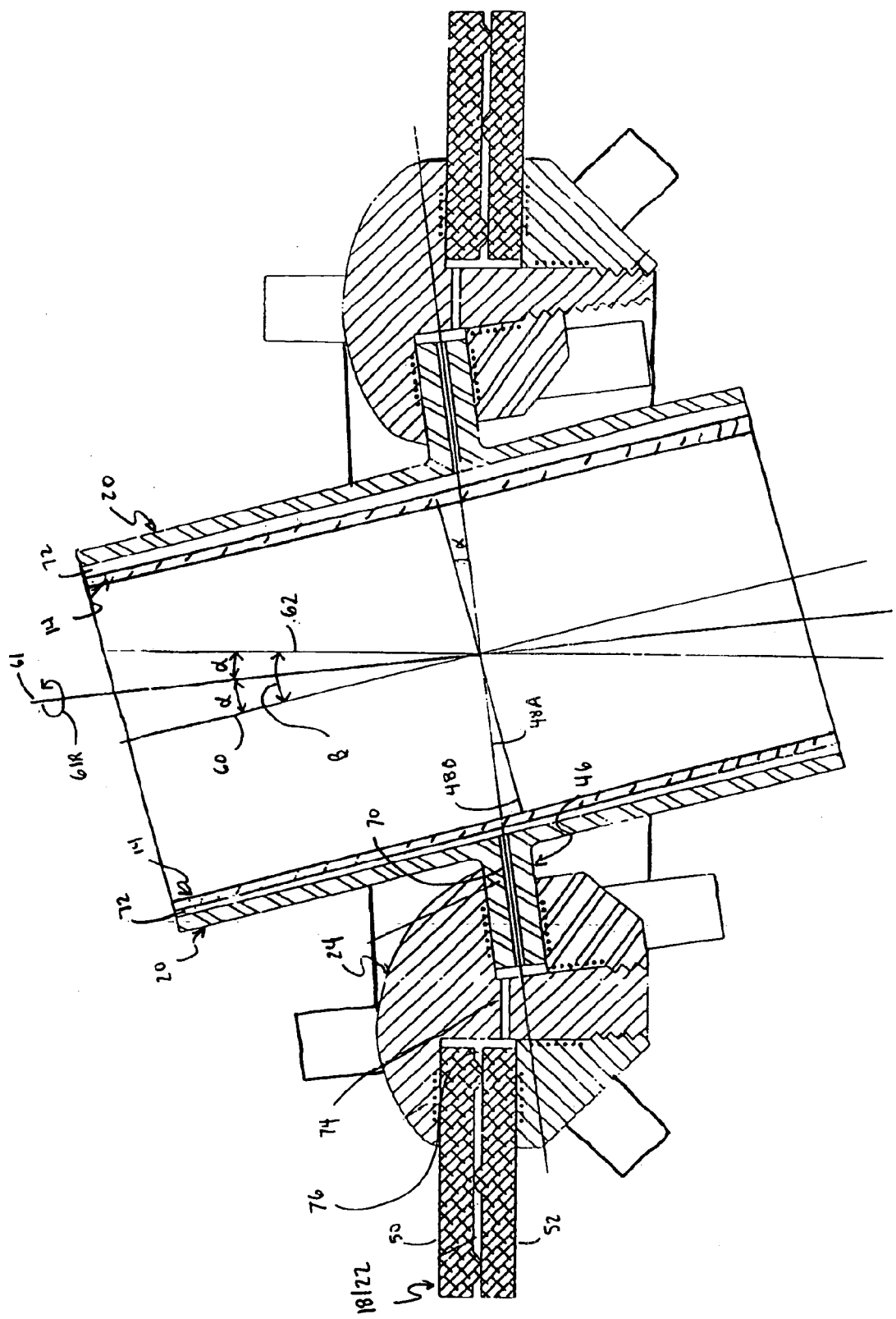
FIG. 5 is a cross-sectional view of the penetration fitting of FIG. 3 having a maximum insertion angle.

The penetration fitting 24 according to one embodiment of the present invention also allows the product pipeline 15 to be inserted into the containment sumps 22 at any one of a variety of different insertion angles $\beta$, wherein the insertion angle $\beta$ is defined herein as being an angle between a longitudinal axis 60 of the secondary pipeline 20 and a line 62 that is perpendicular to the outer wall 50 of the double walled containment sump 22 (see FIGS. 4 and 5).

As shown in FIGS. 4 and 5, the offset collar 46 is coupled to the outer diameter of the secondary pipeline 20 such that the radial axis 48A of the offset collar 46 forms the offset angle $\alpha$ with the radial axis 48B of the secondary pipeline 20. Therefore, the longitudinal axis 60 of the secondary pipeline 20 also forms the offset angle $\alpha$ with a longitudinal axis 61 of the offset collar 46. Preferably, the offset angle $\alpha$ is in a range of approximately 10° to approximately 20°.

FIG. 4 shows the secondary pipeline 20 at a minimum insertion angle $\beta$, which in the depicted embodiment is an angle of approximately 0° (i.e. the longitudinal axis 60 of the secondary pipeline 20 is parallel with a line 62 that is perpendicular to the outer wall 50 of the double walled containment sump 22.)

The insertion angle $\beta$ is variable by rotating the offset collar 46 about the longitudinal axis 61 of the offset collar 46. This rotation causes the secondary pipeline 20 to similarly rotate about the longitudinal axis 61 of the offset collar 46, that is, the longitudinal axis 60 of the secondary pipeline 20 rotates in a circle about the longitudinal axis 61 of the offset collar 46. For example, starting at an insertion angle $\beta$ of approximately 0° (shown in FIG. 4), rotating the collar 46 one revolution about the longitudinal axis 61 of the offset collar 46 (indicated by rotation arrow 61R in FIG. 5), causes the longitudinal axis 60 of the secondary pipeline 20 to form an insertion angle $\beta$ that is approximately equal to the offset angle $\alpha$ after 90° of rotation, an insertion angle $\beta$ that is approximately equal to two times the offset angle $\alpha$ after 180° of rotation (shown in FIG. 5), an insertion angle $\beta$ that is approximately equal to the offset angle $\alpha$ after 270° of rotation, and an insertion angle $\beta$ that is approximately equal to 0° after 360° of rotation (shown in FIG. 4). Therefore, by rotating the offset collar 46 by an appropriate amount, the insertion angle $\beta$ of the product pipeline 15 with respect to the containment sump 22 can be set at any angle between an angle of 0° and an angle of two times the offset angle $\alpha$. Although the offset angle $\alpha$ has been described in a preferred embodiment as being approximately 10° to 20°, the offset angle $\alpha$ can be set at any desired angle to achieve any desired maximum insertion angle $2\alpha$.

Once the offset collar 46 has been rotated by a desired amount, such that the insertion angle $\beta$ is at a desired angle, the inner and outer clamp rings 38 and 40 of the penetration fitting 24 may be installed and the previously described fusion sockets 54, 56 and 58 may be charged to fuse the penetration fitting 24 to each of the secondary pipeline 20 and the containment sump 22.

Figure 6:
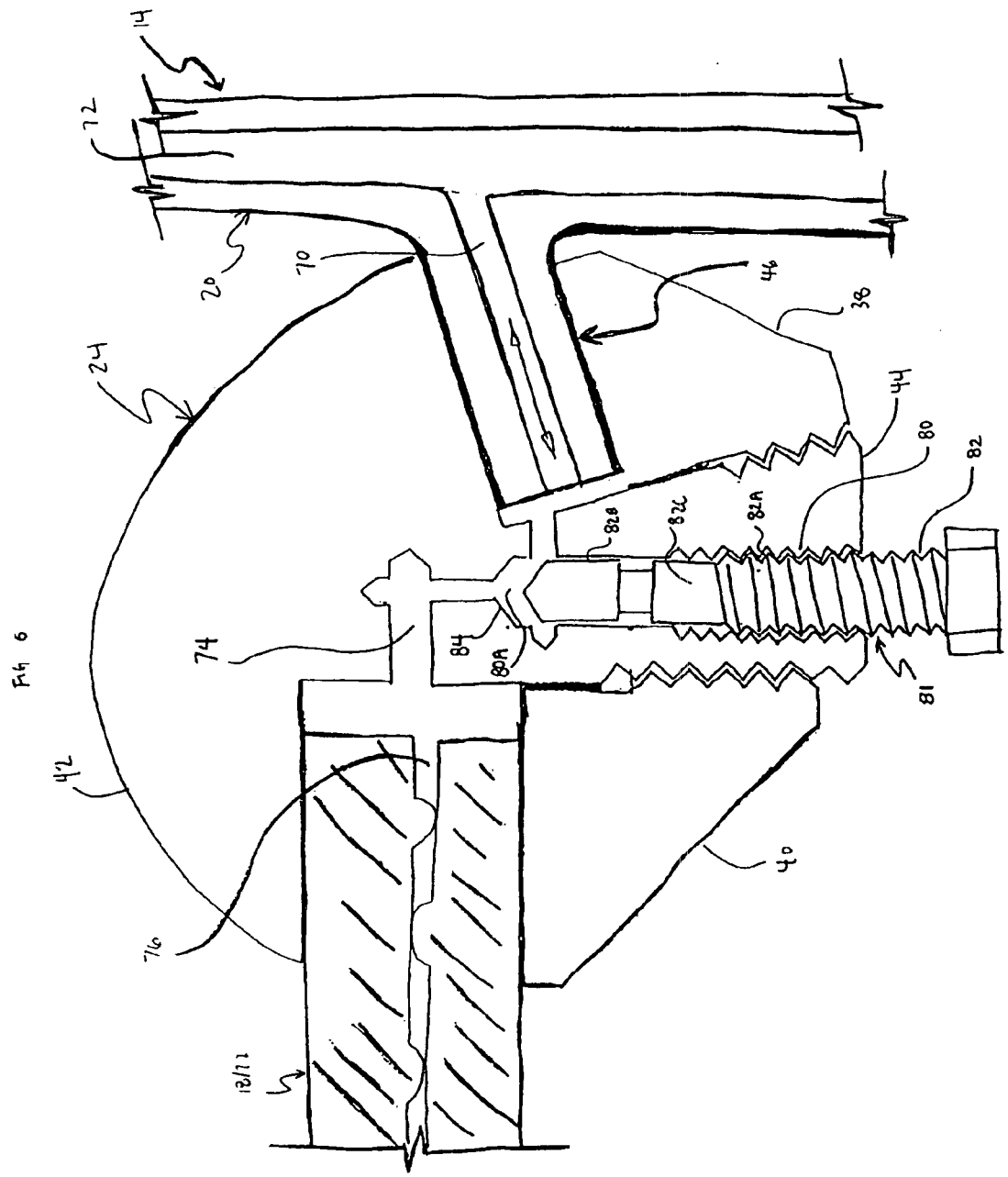
FIG. 6 is a cross-sectional view of a penetration fitting according to one embodiment of the present invention having a shut-off valve system.

Referring to FIGS. 4–6, a contiguous interstitial pathway exists between a product pipeline interstitial space 72, which is between the primary and secondary pipelines 14 and 20 (see FIGS. 1 and 4–6); an offset collar interstitial space 70, which is formed by drilling or molding at least one bore hole in the offset collar 46; a penetration fitting interstitial space 74, which is formed by drilling or molding at least one bore hole between the nipple portion 44 and the semi-circular portion 42 of the penetration fitting 24; and a containment sump interstitial space 76, which is between the outer and inner walls 50 and 52 of the containment sump 22.

To assist in testing and diagnostics of the contiguous double containment underground storage tank fueling system 10 according to the present invention, in one embodiment the penetration fitting 24 is capable of isolating the containment sump interstitial space 76 and the product pipeline interstitial space 72, i.e. preventing communication between the spaces 72 and 76. This may be accomplished by a shut off valve system 81, or in the alternative, an additional clamp, such as an elastomer boot type fitting, each of which is discussed below.

As shown in FIG. 6, the shut off valve system 81 includes a threaded bore 80 and a threaded element 82 installed in the nipple portion 44 of the penetration fitting 24 to regulate interstitial communications between the containment sump interstitial space 76 and the product pipeline interstitial space 72. The threaded bore 80 may extend through the nipple portion 44 and transverse the penetration fitting interstitial space 74. The threaded bore 80 may terminate at a screw point 84 adapted to receive an end of the threaded element 82.

The threaded element 82 includes a threaded body 82A and a slender-shaped screw head 82B adapted to engage the screw point 84 of the threaded bore 80. An o-ring seal 82C is provided between the screw head 82B and the threaded body 82A to prevent any of the product 13 from escaping through the bore 80 when the threaded element 82 is disposed therein.

When the screw head 82B of the threaded element 82 is not engaged with the screw point 84 of the threaded bore 80, an interstitial pathway exists between the containment sump interstitial space 76, the penetration fitting interstitial space 74, a portion 80A of the bore 80 that is not occluded by the threaded element 82, the offset collar interstitial space 70, and the product pipeline interstitial space 72. As such, communication exists between the containment sump interstitial space 76 and the product pipeline interstitial space 72. On the other hand, when the screw head 82B of the threaded element 82 is engaged with the screw point 84 of the threaded bore, the interstitial pathway between the containment sump interstitial space 76 and the product pipeline interstitial space 72 is occluded or blocked.

During normal operation of the contiguous double containment underground storage tank fueling system 10, the threaded element 82 is not engaged with the screw point 84 of the threaded bore 80, such that a communication between the containment sump interstitial space 76 and the product pipeline interstitial space 72 is allowed via the penetration fitting 24. When necessary for installation, testing, or repair, however, the threaded element 82 may be engaged with the screw point 84 of the threaded bore 80 (or a clamp may be installed as described below) to prevent communication between containment sump interstitial space 76 and the product pipeline interstitial space 72.

In one embodiment the contiguous double containment underground storage tank fueling system 10 is able to monitor and detect leaks in the product piping and/or leaks in the containment sump 22. For example, the interstitial pathway between and including the containment sump interstitial space 76 and the product pipeline interstitial space 72 may be filled with a monitoring fluid, such as a brine solution, such that any change in the monitoring fluid level may be detected by a high point level sensor 78 which may be located, for example, in the dispenser containment sump 18 (see FIG. 1).

Software controlling the level sensor 78 is preferably used to "learn" or detect a normal pattern of monitoring fluid level variations due to such factors as temperature changes, pump operation, and system or component maintenance. In accordance with this embodiment, the sensor 78 may detect changes in the monitoring fluid level by comparing changes in the monitoring fluid level along different segments of the product pipeline 15, or, in the alternative, monitor changes in the monitoring fluid level equal hydraulic point at the dispenser 16 and a location remote from the dispenser 16, for example, where the vapor pipeline 15V extends above the ground surface 30. This feature may reduce or eliminate the occurrence of false alarms and increase the probability of detecting an actual system leak or containment failure.

In general, if the monitoring fluid level is below normal, a leak in the outer wall 50 of the containment sump and/or a leak in the secondary pipeline 20 and/or a leak in the inner wall 52 of the tank top containment sump 22 typically exists. Similarly, if the monitoring fluid level is above normal, a leak in the inner wall 52 of the under dispenser containment sump 18 and/or a leak in the primary pipeline 14 typically exists. This can be explained by reference to details A–D of FIG. 1. As shown in detail A, a leak in the outer wall 50 of the containment sump 18 causes monitoring fluid, desig nated as 13A, to exit the containment sump interstitial space 76 and enter the environment surrounding the system 10, thus causing the monitoring fluid level to decrease. As shown in detail B, a leak in the primary pipeline 20 causes product 13 to enter the product pipeline interstitial space 72, thus causing the monitoring fluid level to increase. As shown in detail C, a leak in the inner wall 52 of the top tank containment sump 22 causes monitoring fluid to exit the containment sump interstitial space 76 and enter the and/or collect around an outer wall of the UST, thus causing the monitoring fluid level to decrease. As shown in detail D, a leak in the secondary pipeline 20 causes product 13 to enter the product pipeline interstitial space 72, thus causing the monitoring fluid level to decrease.

Figure 2:
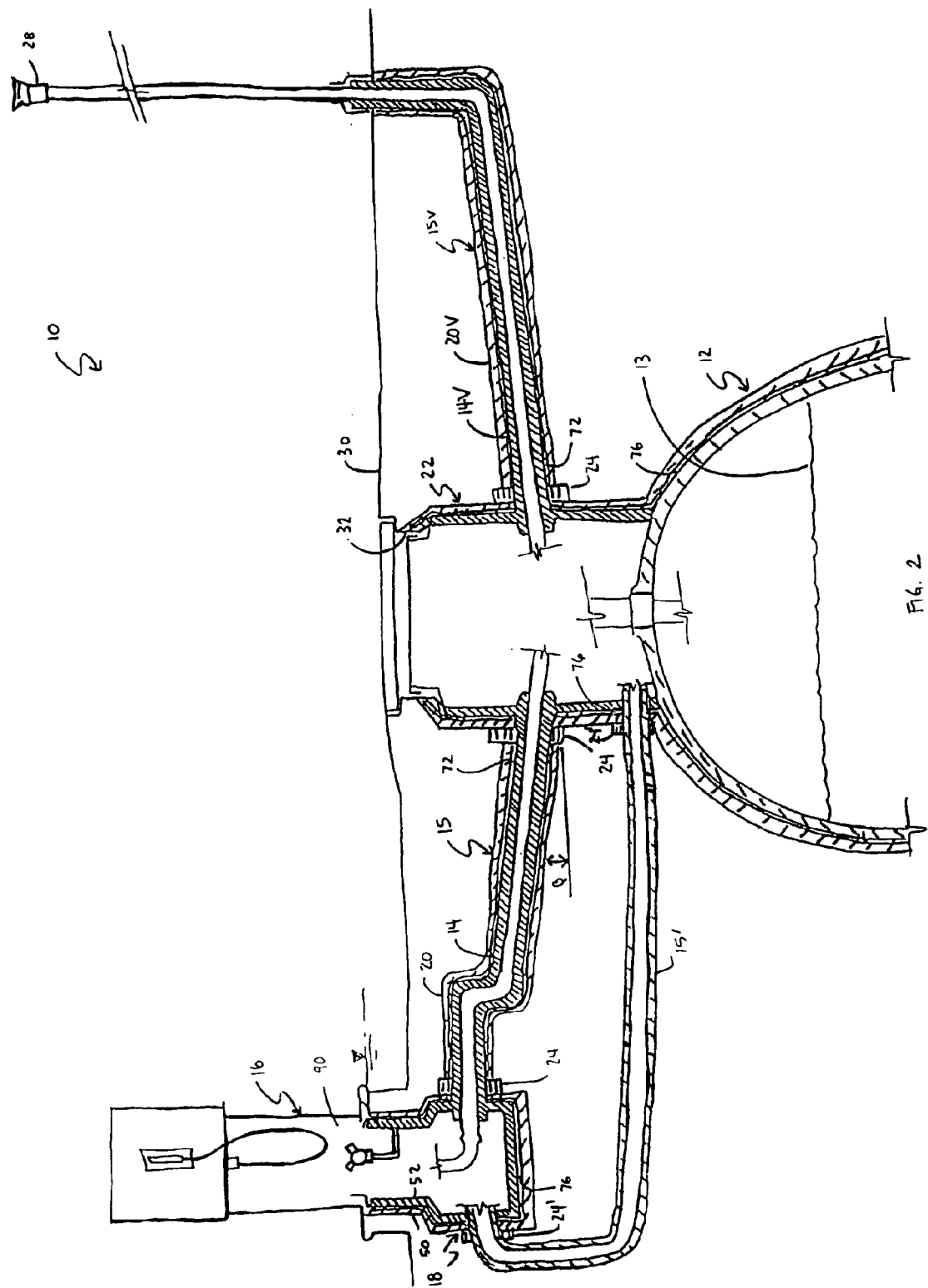
FIG. 2 is a double containment underground storage tank fueling system according to another embodiment of the present invention having a pressure sensor for detecting leaks in the system.

In another embodiment according to the present invention (as shown in FIG. 2), the system monitors and detects leaks in the product piping 15 and/or leaks in the containment sump 22 by use of a gas or vacuum and a pressure sensor. In this arrangement, a gas or vacuum is disposed in the interstitial pathway between the containment sump interstitial space 76 and the product pipeline interstitial space 72 and a vacuum pump and controller 90 measures the pressure in the interstitial pathway. Similar to the monitoring fluid level measurement method described above, software may be used to "learn" or detect a normal pattern of the pressure or vacuum in the interstitial pathway between the containment sump interstitial space 76 and the product pipeline interstitial space 72, thus increasing the probability of accurately detecting leaks and containment failures.

Another variation of this method includes using the vacuum pump and controller 90 to apply a constant vacuum to the interstitial pathway and measuring the pressure decay, flow rate and the presence of hydrocarbon vapors to determine if a leak exists. In such a system, a failure in the primary pipeline 14 is indicated by a sudden increase in hydrocarbon vapors, an increase in vacuum pump flow rate and/or vacuum loss.

The novel features of the various embodiments of the system 10 described above may be installed in new UST sites or retrofitted to existing UST sites. A new UST fueling system site may require the use of prefabricated double walled under dispenser and tank top containment sumps 18 and 22 together with double walled product pipelines 15 and penetration fittings 24 as described above.

Retrofitting existing UST sites with fiberglass single walled containment structures and double walled pipelines consists of constructing an inner wall inside the containment sump to create a containment sump interstitial space. This may be accomplished by using several methods including a three-dimensional fiberglass fabric in which the existing containment sump becomes a female mold or by applying a porous inner material that is coated with a fiberglass covering. With this example, the porous material becomes the containment sump interstitial space. After the retrofitted double wall containment sump is completed, the penetration fittings 24 be installed.

Particular embodiments of the invention disclosed in this application provide high levels of integrity to a UST systems by detecting failures in the containment sump 22 walls, the penetration fittings 24 and or the product pipelines 15.

Other figures presented in this application show various methods of varying insertion angle β of the product pipeline 15 with respect to the containment sump 22 walls and various methods for providing communication between the containment sump interstitial space 76 and the product pipeline interstitial space 72.

Figure 7:
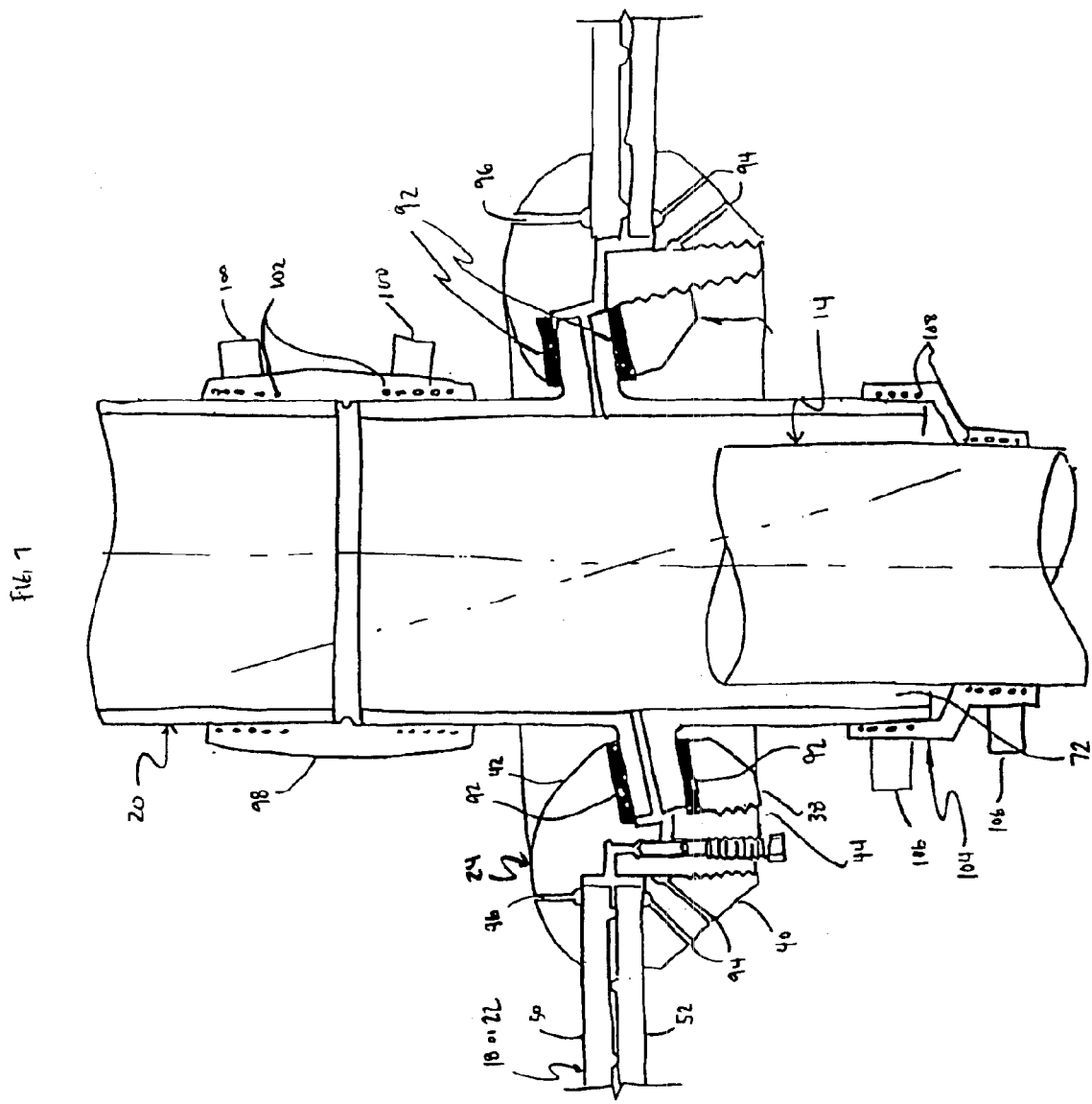
FIG. 7 is a cross-sectional view of a FRP bonded type penetration fitting.

The alternative embodiment of FIG. 7 includes an FRP bonded type penetration fitting 24 with HDPE product pipelines 15. In this embodiment, compression gasket seals 92 may be provided between the semi-circular portion 42 of the main fitting element 36 and the offset collar 46, and between the inner clamp ring 38 and the offset collar 46. The outer clamp ring 40 may be bonded, for example, by epoxy, between the outer diameter of the nipple 44 and the inner wall 52 of the containment sump 22 through epoxy pathways 94. The semi-circular portion 42 of the main fitting element 36 may similarly be epoxy bonded to the outer wall 50 of the containment sump 22 through epoxy pathway 96.

As shown in FIG. 7, segments of the secondary pipeline 20 may be bonded together, for example, by electro-fusion with an external sleeve 98 having fusing sockets 100 and a plurality of electrodes 102 electrically connected thereto as described above. In addition, in accordance with this embodiment, the primary pipeline 15 is coupled to the secondary piping by an electro-fusion termination boot 104 having fusing sockets 106 and a plurality of electrodes 108 electrically connected thereto as described above.

Figure 8:
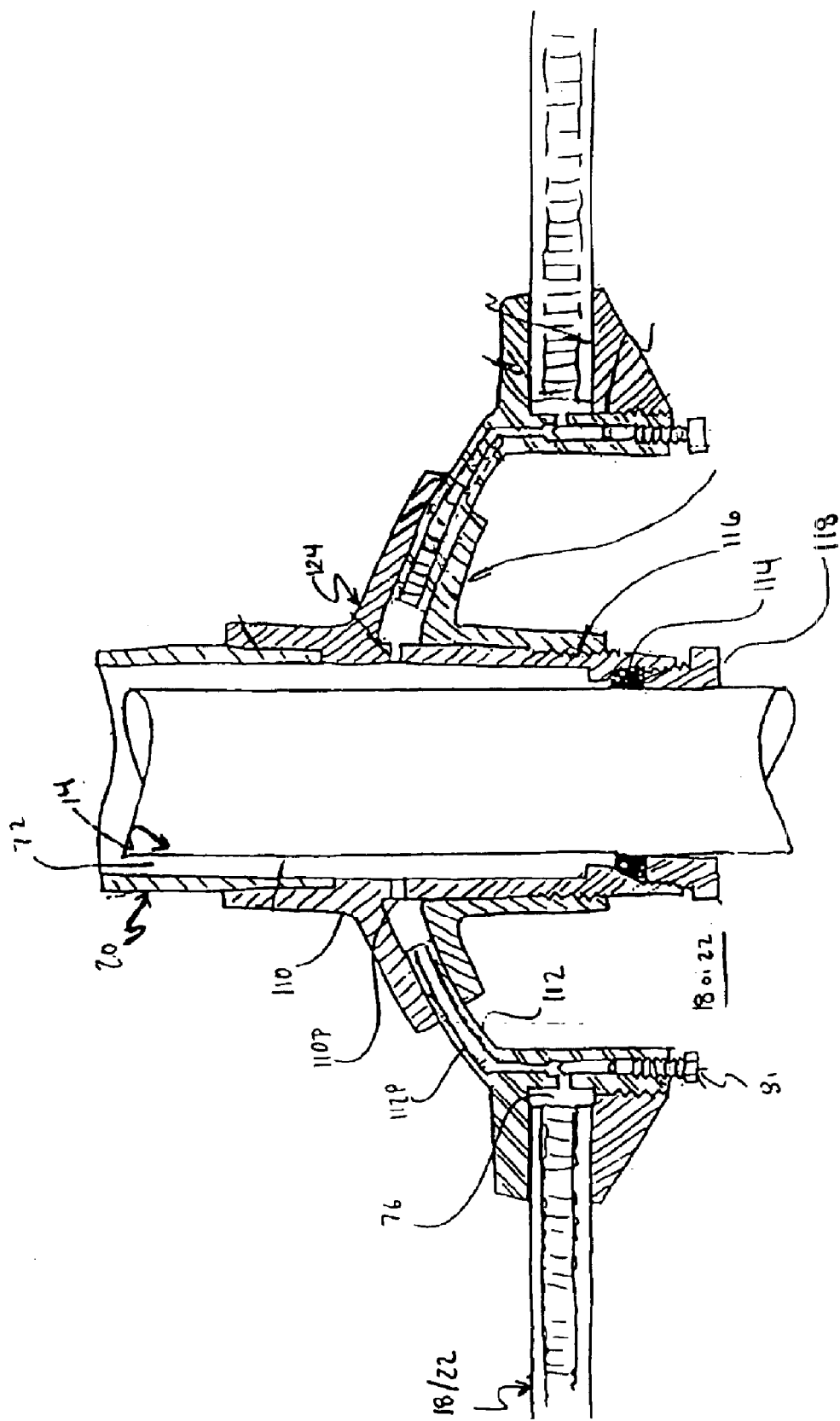
FIG. 8 is a cross-sectional view of a ball and socket type penetration fitting.

In an alternative embodiment, as shown in FIG. 8, a penetration fitting 124 may be configured in a ball-socket type configuration. In this embodiment, the secondary pipeline 20 is bonded to a spherical joint 110 that is coupled to a spherical socket 112 in the containment sump 22. The spherical joint 110 is rotatably coupled to the spherical socket 112 to provide universal variation in the insertion angle. Once the desired insertion angle is established, the spherical joint 110 may be permanently fixed to the spherical joint 112 by bonding, welding or the like. By increasing the size and arc of the spherical joint 110 and socket 112, increased variation in the insertion angle may be achieved.

The spherical joint 112 includes an interstitial port 110P in communication with an interstitial passage 112P in the spherical socket 112 for communicating interstitial fluid between the product pipeline interstitial space 72 and the containment sump interstitial space 76. A shut off valve system 81 as described above may be installed in the spherical socket 112 to regulate interstitial communication between the product pipeline interstitial space 72 and the containment sump interstitial space 76.

A compression ring 114, such as an elastomeric o-ring may be connected to the primary pipeline 14 to contain interstitial fluid within the product pipeline interstitial space 72. For example, the spherical socket 112 may be threadingly connected to a first threaded member 116 that is threadingly engaged to a second threaded member 118, such that the first and second threaded members 116 and 118 secure the compression ring 114 to the primary pipeline 14.

Figure 9:
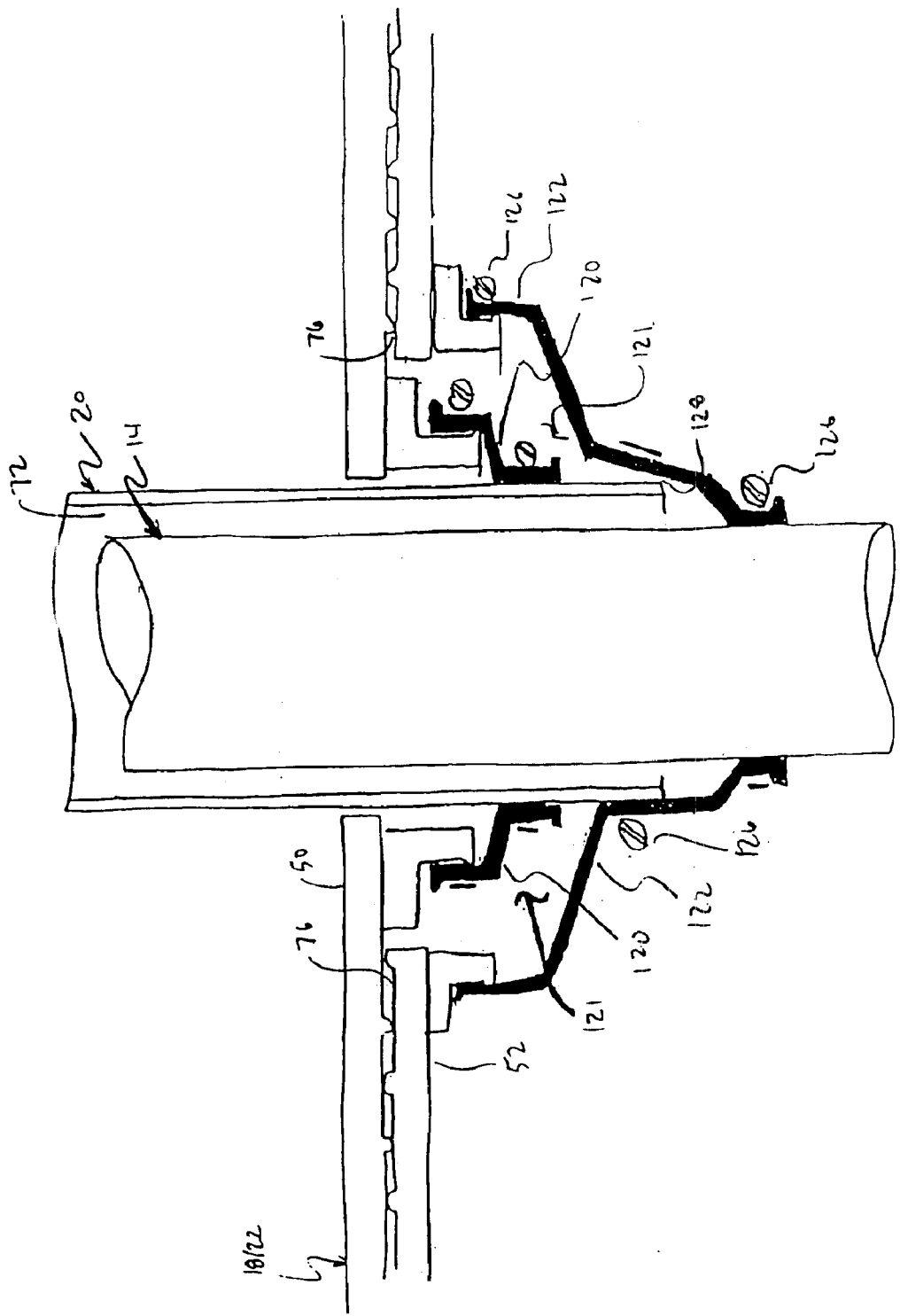
FIG. 9 is a cross-sectional view of an elastomeric type penetration fitting.

As shown in FIG. 9, interstitial communication between the product pipeline interstitial space 72 and the containment sump interstitial space 76 may be achieved by the use of an elastomer type penetration fitting. This fitting includes an inner flexible boot 120 coupled to the outer wall 50 of the containment sump 22 and the secondary pipeline 20 and an outer flexible boot 122 coupled to the inner wall 52 of the containment sump 22 and the primary pipeline 14. The inner and outer boots 120 and 122 define a passage 121 for interstitial communication between the product pipeline interstitial space 72 and the containment sump interstitial space 76. Interstitial communication between the product pipeline interstitial space 72 and the containment sump interstitial space 76 may be regulated by attaching clamps 126 to the outer boot 122 to releasably engage the outer boot 122 with the outer diameter of the secondary pipeline 20.

For example, in the depicted embodiment, an intermediate one of the clamps 126 is loosened to create a gap 128 between the outer boot 122 and the outer diameter of the secondary pipeline 20. As an interstitial path is established through which interstitial fluid may pass between the product pipeline interstitial space 72 and the containment sump interstitial space 76 via the gap 128 and the interstitial passage 121. However, this interstitial path may be sealed of to prohibit interstitial communication between the piping and the product pipeline interstitial space 72 and the containment sump interstitial space 76 by tightening the clamps 126 until the gap 128 does not exist.

FIG. 1 also shows an electrical conduit 15'. In one embodiment, the electrical conduit 15' is connected to the dispenser containment sump 18 via a penetration fitting 24' and to the tank top containment sump 22 via the penetration fitting 24'. The electrical conduit 15' may be used, for example, in sending electrical signals between a pump (not shown) in the top tank containment sump 22 and the above ground product dispenser 16.

Figure 10:
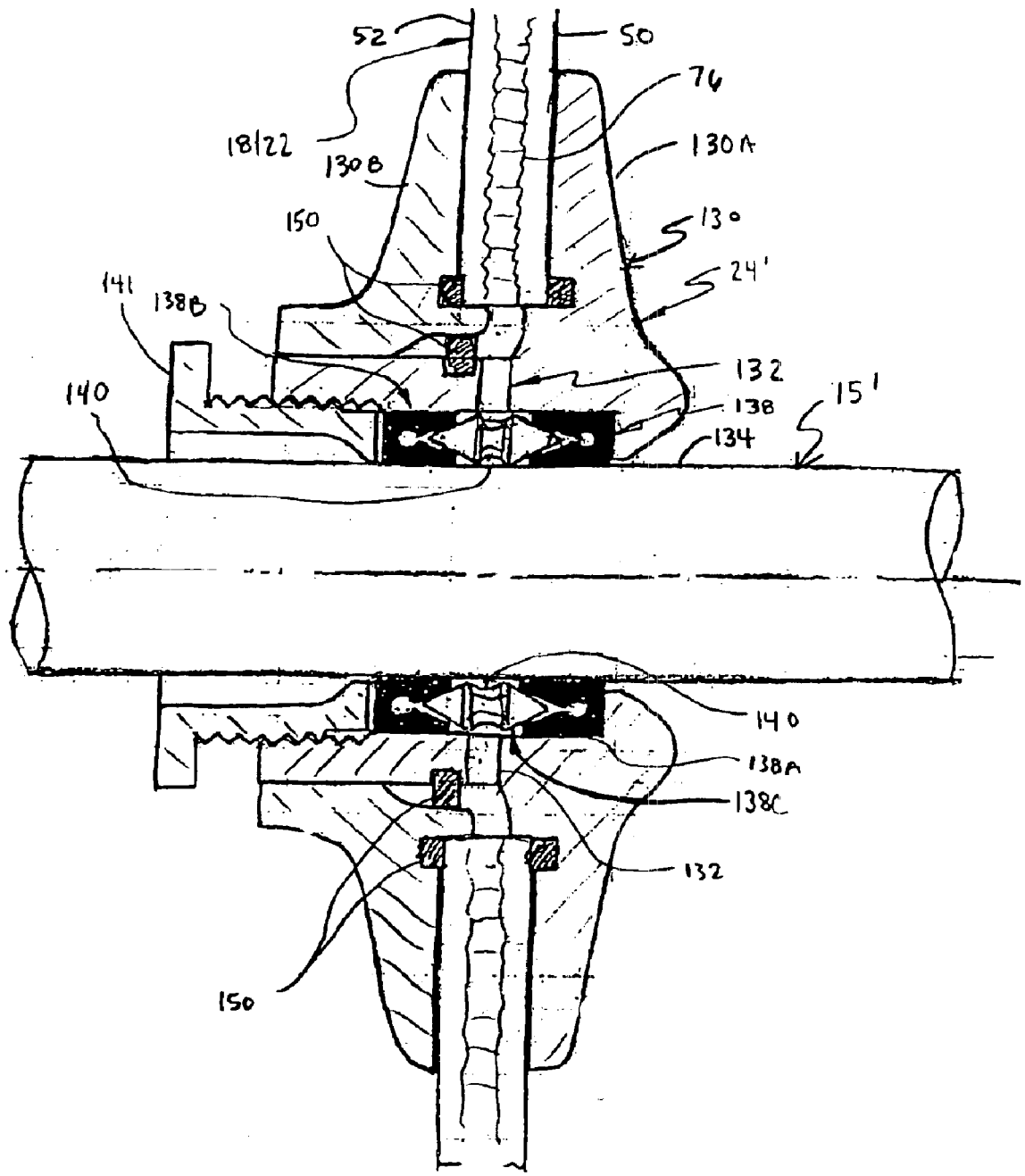
FIG. 10 is a cross-sectional view of a penetration fitting for an electrical conduit.

FIG. 10 shows an exemplary embodiment of the penetration fitting 24' for sealingly connecting the electrical conduit 15' to the containment sump 22. As shown, the penetration fitting 24' includes a flange 130 having an interstitial space 132 (which may be formed as circumferential openings in the flange 130) that is in fluid communication with the containment sump interstitial space 76 and an outer surface 134 of the electrical conduit 15'. In such an arrangement, a monitoring fluid or gas as described above can be disposed in the interstitial spaces 132 and 76 of the penetration fitting 24' and the containment sump 22, respectively. As such, any leak in the penetration fitting 24' or the containment sump 22 can be detected by monitoring the monitoring fluid level or by monitoring the monitoring gas pressure as described above. The remaining components shown in FIG. 10 will be described with reference to the description of FIGS. 11A–11G.

FIGS. 11A–11G show an exemplary penetration fitting 24' and a method of securing the penetration fitting 241 to the containment sump 22. As shown in FIG. 11A, cutting means 136 such as a drill, may be used to create an opening in the containment sump 22. An outer flange 130A may be inserted through the opening and secured to the containment sump 22, such as by an adhesive 135, as shown in FIGS. 11B–11C. An inner flange 130B may be secured to the outer flange 130A and to the containment sump 22, such as by an adhesive 135, as shown in FIG. 11D. In this embodiment, the penetration fitting interstitial space 132 may extend across the outer flange 130A, the inner flange 130B, or both the outer and the inner flanges 130A and 130B, respectively.

When the electrical conduit 15' is inserted into the penetration fitting 24', a sealing element 138 may be placed around the electrical conduit 15' as shown in FIGS. 11E and 11F. For example, the sealing element 138 may include a first o-ring 138A, a second o-ring 138B, and a spacer 138C, such as a perforated spacer, disposed therebetween. In an exemplary embodiment, the o-rings 138A and 138B and the spacer 138C are elastomeric o-rings. The sealing element 138 includes an interstitial spacing 140 (which may be formed as circumferential openings in the sealing element 140) that is in fluid communication with the penetration fitting interstitial space 132 and the outer surface 134 of the electrical conduit 15'. The sealing element interstitial space 140 may extend across any or all of the first o-ring 138A, the second o-ring 138B, and the spacer 138C.

In one embodiment, the penetration fitting 24' further includes a fitting 141 for securing the sealing element 138 to the electrical conduit 15', such that the sealing element 138 is disposed between the fitting 141 and the flange 130 as shown in FIGS. 11F and 11G. The fitting 141 may be secured to the flange 130 through a threaded connection. For example, in the depicted embodiment, the fitting 141 includes external threads that threadably engage internal threads in the outer flange 130A. In one embodiment, the penetration fitting 24' is composed of a fiberglass reinforced plastic that may be formed by compression bulk molding, vacuum resin transfer processing or another suitable method. The penetration fitting 24' may be inserted into the containment sump 22 at any one of a variety of different insertion angles by any of the method described above with respect to varying the insertion angle of the product pipeline 15. The penetration fitting 24' may further include additional sealing elements 150, such as seals, O-rings or gaskets located as appropriate for the penetration fitting 24' to form a fluid tight seal with the containment sump 22 and the electrical conduit 15'.

One of the features of the various embodiments of penetration fitting of the present invention is the possible elimination of the elastomer boot. As discussed above, a large percentage of elastomer boot fittings fail after installation. Yet, the industry standard practice for sealing underground piping into a containment sump structure is to use a flexible element to reduce piping stress and allow for some misalignment. The penetration fitting of some embodiments of the present invention has only minimal flexure and may be considered a rigid element of the piping and sump system.

However, the American Petroleum Institute (API) *Installation of Underground Petroleum Storage Systems*—API Recommended Practice 1615, 5$^{th}$ Edition, March 1996, states in section 9.5.3 that it is an acceptable practice to use FRP fittings and that they can be used to create a flexible joint. Thus, installation of a new fitting in accordance with the present invention with contiguous monitored interstitial and rigid penetration fittings would provide a far superior installation to what is currently standard industry practice.

While the present invention describes the penetration fittings and its various embodiments for attaching the product pipeline with the containment sump, it would be obvious to one skilled in the art to use the penetration fitting of the present invention for adjoining double walled fuel or vapor piping with a double wall LDPE dispenser, fill, or turbine sump.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, spirit and scope of this invention. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A penetration assembly for forming a sealed connection between a conduit and a containment sump in an underground storage tank fueling system, the penetration assembly comprising:

a main fitting element for forming a sealed connection to each of the conduit and the containment sump, the main fitting element including an interstitial space that is in fluid communication with an interstitial space in each of the conduit and the containment sump.

2. The penetration assembly of claim 1, wherein the conduit is a double walled product pipeline having an interstitial space and the containment structure is a double walled structure having an interstitial space, and wherein the main fitting interstitial space is in fluid communication with each of the product pipeline interstitial space and the containment structure interstitial space.

3. The penetration assembly of claim 2, wherein the main fitting element includes an outer portion having a first sealing surface for sealing to the containment structure and a second sealing surface for sealing to the product pipeline, and wherein the main fitting element includes an inner portion threadably engaged to at least one clamp for securing the first sealing surface to the containment structure and the second sealing surface to the product pipeline.

4. The penetration assembly of claim 3, wherein the outer portion includes a fusion socket and at least one electrode, wherein the fusion socket is electrically connected to the at least one electrode such that a charge supplied to the at least one electrode from the fusion socket produces heat for fusing the first sealing surface to the containment structure and the second sealing surface to the product pipeline.

5. The penetration assembly of claim 4, wherein the at least one clamp includes a clamp fusion socket and at least one clamp electrode, wherein the clamp fusion socket is electrically connected to the at least one clamp electrode such that a charge supplied to the at least one clamp electrode from the fusion socket produces heat for fusing a first surface of the at least one clamp to the inner portion of the main fitting element and a second surface of the at least one clamp to the product pipeline.

6. The penetration assembly of claim 4, wherein the at least one clamp includes an inner clamp threadably engaged with a first side of the inner portion of the main fitting element and an outer clamp threadably engaged with a second side of the inner portion of the main fitting element, wherein the inner clamp includes an inner clamp fusion socket and at least one inner clamp electrode such that a charge supplied to the at least one inner clamp electrode from the inner clamp fusion socket produces heat for fusing a first surface of the inner clamp to the first side of the inner portion of the main fitting element and a second side of the inner clamp to the product pipeline, and wherein the outer clamp includes an outer clamp fusion socket and at least one outer clamp electrode such that a charge supplied to the outer clamp electrode from the outer clamp fusion socket produces heat for fusing a first surface of the outer clamp to the second side of the inner portion of the main fitting element and a second side of the outer clamp to the containment structure.

7. The penetration assembly of claim 2, further comprising a coupling engaged with the interstitial space of the main fitting element and having a first position for occluding the interstitial space of the main fitting element and a second position allowing fluid communication through the interstitial space of the main fitting element.

8. The penetration assembly of claim 1, wherein the main fitting element is composed of a rigid material.

9. The penetration assembly of claim 8, wherein the rigid material is chosen from the group consisting of a high density polyethylene and a fiberglass reinforced plastic.

10. The penetration assembly of claim 1, wherein the conduit is an electrical conduit having an outer surface and the containment structure is a double walled structure having an interstitial space, and wherein the main fitting interstitial space is in fluid communication with each of the electrical conduit outer surface and the containment structure interstitial space.

11. An underground storage tank fueling system comprising:
   a product pipeline comprising a primary pipeline, a secondary pipeline and a product pipeline interstitial space extending therebetween;
   a containment sump having an inner wall, an outer wall and a containment sump interstitial space extending therebetween; and
   a penetration fitting forming a sealed connection with the conduit and the containment sump to sealingly connect the conduit to the containment sump, wherein the penetration fitting comprises a penetration fitting interstitial space that is in fluid communication with each of the product pipeline interstitial space and the containment sump interstitial space, forming a contiguous interstitial pathway between the product pipeline interstitial space and the containment sump interstitial space.

12. The system of claim 11, wherein the conduit comprises a product pipeline having a primary pipeline, a secondary pipeline and a product pipeline interstitial space therebetween, and wherein the penetration fitting interstitial space is in fluid communication with each of the product pipeline interstitial space and the containment structure interstitial space, forming a contiguous interstitial pathway between the product pipeline interstitial space and the containment structure interstitial space.

13. The system of claim 12, further comprising a monitoring fluid disposed in the contiguous interstitial pathway and a sensor communicating with the monitoring fluid to monitor the level of the monitoring fluid.

14. The system of claim 12, further comprising a gas disposed in the contiguous interstitial pathway and a sensor communicating with the gas to monitor the pressure in the contiguous interstitial pathway.

15. The system of claim 12, wherein the penetration fitting comprises a first fusion socket and at least one first electrode adjacent to the product pipeline, wherein a charge supplied to the at least one first electrode from the first fusion socket produces heat that fuses a first portion of the penetration fitting to the product pipeline, and wherein the penetration fitting comprises a second fusion socket and at least one second electrode adjacent to the product pipeline, wherein a charge supplied to the at least one second electrode from the second fusion socket produces heat that fuses a second portion of the penetration fitting to the containment structure.

16. The system of claim 12, further comprising a coupling engaged with the penetration fitting interstitial space and having a first position for occluding the interstitial space to occlude a portion of the contiguous interstitial pathway thus preventing communication between the product pipeline interstitial space and the containment structure interstitial space and a second position that does not occlude the contiguous interstitial pathway and allows a communication between the product pipeline interstitial space and the containment structure interstitial space.

17. The system of claim 11, wherein the penetration fitting is composed of a rigid material.

18. The system of claim 12, wherein the product pipeline comprises an offset collar that forms a first angle between a radial axis of the product pipeline and a radial axis of the offset collar.

19. The system of claim 18, wherein the product pipeline comprises an insertion angle defined as an angle between a longitudinal axis of the product pipeline and a line that is perpendicular to a wall of the containment structure, wherein the insertion angle is variable by rotating the offset collar about a longitudinal axis of the offset collar.

20. The system of claim 19, wherein the insertion angle is variable from an angle of approximately 0° to an angle of approximately two times the first angle by rotating the offset collar about a longitudinal axis of the offset collar.

21. The system of claim 11, wherein the conduit is an electrical conduit having an outer surface, and wherein the penetration fitting interstitial space is in fluid communication with each of the electrical conduit outer surface and the containment structure interstitial space, forming a contiguous interstitial pathway between the electrical conduit outer surface and the containment structure interstitial space.

22. The system of claim 21, further comprising a monitoring fluid disposed in the contiguous interstitial pathway and a sensor communicating with the monitoring fluid to monitor the level of the monitoring fluid.

23. The system of claim 21, further comprising a gas disposed in the contiguous interstitial pathway and a sensor communicating with the gas to monitor the pressure in the contiguous interstitial pathway.

24. A method for detecting leaks in an underground storage tank fueling system comprising:
   providing a product pipeline comprising a primary pipeline, a secondary pipeline and a product pipeline interstitial space extending therebetween;
   providing a containment sump having an inner wall, an outer wall and a containment sump interstitial space extending therebetween; and
   sealingly connecting a penetration fitting to the conduit and to the containment sump to sealingly connect the conduit to the containment sump;
   forming an interstitial space in the penetration fitting that is in fluid communication with each of the product pipeline interstitial space and the containment sump interstitial space, forming a contiguous interstitial pathway between the product pipeline interstitial space and the containment sump interstitial space.

25. The system of claim 24, wherein the conduit comprises a product pipeline having a primary pipeline, a secondary pipeline and a product pipeline interstitial space therebetween, and wherein the penetration fitting interstitial space is in fluid communication with each of the product pipeline interstitial space and the containment structure interstitial space, forming a contiguous interstitial pathway between the product pipeline interstitial space and the containment structure interstitial space.

26. The method of claim 25, further comprising providing a monitoring fluid in the contiguous interstitial pathway and providing a sensor communicating with the monitoring fluid to monitor the level of the monitoring fluid.

27. The method of claim 25, further comprising providing a gas in the contiguous interstitial pathway and providing a sensor communicating with the gas to monitor the pressure in the contiguous interstitial pathway.

28. The method of claim 24, wherein the conduit is an electrical conduit having an outer surface, and wherein the penetration fitting interstitial space is in fluid communication with each of the electrical conduit outer surface and the containment structure interstitial space forming a contiguous interstitial pathway between the electrical conduit outer surface and the containment structure interstitial space.

29. The method of claim 28, further comprising providing a monitoring fluid in the contiguous interstitial pathway and providing a sensor communicating with the monitoring fluid to monitor the level of the monitoring fluid.

30. The method of claim 28, further comprising providing a gas in the contiguous interstitial pathway and providing a sensor communicating with the gas to monitor the pressure in the contiguous interstitial pathway.

31. The penetration assembly of claim 1, wherein the containment sump is an underground storage tank.

32. The system of claim 11, wherein the containment sump is an underground storage tank.

33. The method of claim 24, wherein the containment sump is an underground storage tank.

34. The penetration assembly of claim 1, wherein the containment sump is a product dispenser containment sump.

35. The system of claim 11, wherein the containment sump is a product dispenser containment sump.

36. The method of claim 24, wherein the containment sump is a product dispenser containment sump.

* * * * *